(12) United States Patent
Arora et al.

(10) Patent No.: US 8,463,895 B2
(45) Date of Patent: *Jun. 11, 2013

(54) SYSTEM AND COMPUTER PROGRAM PRODUCT TO PREDICT EDGES IN A NON-CUMULATIVE GRAPH

(75) Inventors: Pankaj Arora, Karnal (IN); Sameep Mehta, New Delhi (IN); Laurent S. Mignet, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1594 days.

This patent is subject to a terminal disclaimer.

(21) Appl. No.: 11/947,329

(22) Filed: Nov. 29, 2007

(65) Prior Publication Data

US 2009/0144032 A1    Jun. 4, 2009

(51) Int. Cl.
    *G06F 15/173*    (2006.01)
(52) U.S. Cl.
    USPC .............. 709/224; 709/226; 703/13; 345/441
(58) Field of Classification Search
    None
    See application file for complete search history.

(56) References Cited

U.S. PATENT DOCUMENTS

| | | | |
|---|---|---|---|
| 4,254,409 A | 3/1981 | Busby | |
| 5,594,897 A | 1/1997 | Goffman | |
| 5,926,462 A * | 7/1999 | Schenkel et al. | 370/254 |
| 5,986,666 A * | 11/1999 | Couvet et al. | 345/420 |
| 6,369,819 B1 | 4/2002 | Pitkow et al. | |
| 6,662,354 B1 | 12/2003 | Krablin et al. | |
| 6,745,134 B2 | 6/2004 | Kobayashi et al. | |
| 7,072,977 B1 * | 7/2006 | Bernard et al. | 709/238 |
| 7,194,466 B2 | 3/2007 | Chen et al. | |
| 2003/0220984 A1 | 11/2003 | Jones et al. | |
| 2005/0097161 A1 | 5/2005 | Chiou et al. | |
| 2005/0131848 A1 | 6/2005 | Chickening et al. | |
| 2005/0259585 A1 | 11/2005 | Sauermann | |
| 2006/0159030 A1 | 7/2006 | Strutt et al. | |
| 2006/0204953 A1 | 9/2006 | Ptitsyn | |
| 2006/0217127 A1 | 9/2006 | Drane et al. | |
| 2007/0021994 A1 | 1/2007 | Chandra et al. | |
| 2007/0244682 A1 | 10/2007 | Ott et al. | |
| 2008/0215301 A1 | 9/2008 | Eyal et al. | |
| 2008/0304421 A1 | 12/2008 | Ramasubramanian et al. | |
| 2009/0204554 A1 | 8/2009 | Koren et al. | |
| 2009/0204964 A1 | 8/2009 | Foley et al. | |
| 2010/0049678 A1 | 2/2010 | Huang et al. | |

OTHER PUBLICATIONS

Castillo, E. et al "Estimating Transition-Probabilities in a Dynamic Graph Model with Unobservable Variables" IEEE Transactions on Relaibility, vol. 50 Issue 2 Jun. 2001 pp. 135-144.

(Continued)

*Primary Examiner* — James A Thompson
*Assistant Examiner* — David H Chu
(74) *Attorney, Agent, or Firm* — Ryan, Mason & Lewis, LLP

(57) ABSTRACT

To predict edges in a non-cumulative graph, based on a sequence of non-cumulative previous occurrences of the graph, the sequence of non-cumulative previous occurrences of the graph is obtained, and topological properties of each of the previous occurrences of the graph are extracted. Topological similarities between each of the previous occurrences of the graph are computed based on the topological properties. The edges of the graph are predicted by computing a score for each possible edge of the graph, based upon the topological similarities.

13 Claims, 3 Drawing Sheets

OTHER PUBLICATIONS

"Six Degrees of Seperation." Downloaded at http://en.wikipedia.org/wiki/Six_degrees_of_seperation#_note-bara.

Leskovec, J et al. "Graphs Over Time: Densification Laws Shrinking Diameter and Possible Explanations" The Eleventh ACM SIGKDD International Conference on Knowledge Discovery and Data Mining, Aug. 21-24, Chicago, 2005.

Liben-Nowell D. et al. "The Link Prediction Problem for Social Networks." Proceedings of the Twelfth International Conference on Information and Knowledge Management, New Orleans pp. 556-559. 2004.

Huang, Z. "Link Prediction on Graph Topology: The Predictive Value of the Generalized Clustering Coefficient." The Twelfth ACM SIGKDD International Conference on Knowledge Discovery and Data Mining, Philadelphia, PA, USA, Aug. 20-23, 2006.

Anthonisse, Jac M "The Rush in a Directed Graph." Printed at the Mathmatical Centre, 1971.

Brandes, U. "A Faster Algorithm for Betweenness Centrality" Journal of Mathematical Sociology, vol. 25(2): 163-177, 2001.

Brandes, U. "Centrality Estimation in Large Networks." Department of Computer and Information Science, University of Konstanz, 2006.

Ferreira, A. et al "A Note on Models, Algorithms, and Data Structures for Dynamic Communication Networks." INRIA, 2002.

Lahiri, M et al "Structure Prediction in Temporal Networks Using Frequent Subgraphs" 2007 IEEE Symposium on Computational Intelligence and Data Mining 2007.

Corset, C. et al. "Computational Methods for Dynamic Graphs." AT&T Shannon Labs, 2003.

Desikan, P. et al. "Mining Temporal Evolving Graphs." Proceedings of the Sixth WEBKDD Workshop, 2004.

\* cited by examiner

|  | $j = 1$ | $j = 2$ | $j = 3$ | $j = 4$ |
|---|---|---|---|---|
| $i = 1$ | 1 | 1 | 0 | 1 |
| $i = 2$ | 1 | 1 | 0 | 1 |
| $i = 3$ | 0 | 0 | 1 | 0 |
| $i = 4$ | 1 | 1 | 0 | 1 |

SYSTEM AND COMPUTER PROGRAM PRODUCT TO PREDICT EDGES IN A NON-CUMULATIVE GRAPH

CROSS-REFERENCE TO RELATED APPLICATION(S)

The present application is related to a commonly assigned U.S. application Ser. No. 11/947,155 entitled "Method to Predict Edges in a Non-Cumulative Graph," and filed on even date herewith, the disclosure of which is incorporated by reference herein in its entirety.

FIELD OF THE INVENTION

The present invention relates to the electrical, electronic and computer arts, and, more particularly, to techniques for graphical analysis of networks, such as telecommunications networks, social networks, and the like.

BACKGROUND OF THE INVENTION

Predicting edges using graph theory is known in the art, and, interest in this field has increased in the recent past, motivated by different businesses, such as networking, including, for example, telecommunications and social networking. Prior art graph theory techniques are built under the same hypothesis: the graph is always growing or, stated differently, the model assumes a cumulative graph through time. That is, the edges and nodes existing at time $T_0$ will always exist in future instances of the graph. Such a graph becomes densely populated over time and hence difficult to analyze. A further disadvantage is that information about a volatile edge may be lost, or the algorithm has to maintain different data structures to store such information.

In general terms, the prior art can be separated into two parts: edge prediction, and models for evolving graphs. The former describes techniques regarding predicting edges in a graph, while the latter describes only different models or data-structures to capture the evolving graphs.

SUMMARY OF THE INVENTION

Principles of the present invention provide techniques for predicting edges in a non-cumulative graph. In one aspect, an exemplary method (which can be computer implemented) for predicting edges of a graph, based on a sequence of non-cumulative previous occurrences of the graph, includes the steps of obtaining the sequence of non-cumulative previous occurrences of the graph; extracting topological properties of each of the previous occurrences of the graph; computing topological similarities between each of the previous occurrences of the graph, based on the topological properties; and predicting the edges of the graph by computing a score for each possible edge of the graph, based upon the topological similarities. Note that a "sequence" of non-cumulative previous occurrences of the graph, as used herein, including the claims, refers to two or more of such occurrences; however, if desired, inventive techniques could be applied to a single previous occurrence of the graph.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system/apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more technical benefits; for example, more accurate infrastructure planning, capacity planning, and provisioning. These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments of the invention provide a method to predict edges in a future instance of a graph, given a sequence of graphs in the past. The prediction returns, for each edge, a probability of existing in the next instance. The probability also indicates the importance of an edge to the integrity of the topology of the graph (this measure can be used on both observed past occurrences as well as the predicted graph).

One or more embodiments of the invention provide a method to predict edges in a sequence of non-cumulative snapshots of a graph through time. The exemplary inventive model does not assume than if an edge appears in a snapshot $T_i$ it will always remain in the future snapshot $T_j$ with $j>i$. In other words, once a snapshot $S_i$ is taken, knowledge associated with the graph at the instance "i" is erased and a new graph is built. An advantage with such graphs is that they are smaller in size (in that there will be fewer edges than if we assumed that all edges always continue for all future snapshots). Moreover, the cumulative graph can be obtained by simplying using an "OR" operator in adjacency lists.

In one or more embodiments of the invention, a graph, as described, is modeled and some basic properties are extracted from it. Then, two notions are defined to predict the arrival of new edges in this graph. Finally, a model is disclosed to predict the future topology of the graph based upon a sequence of non cumulative graphs.

Figures 1, 2:
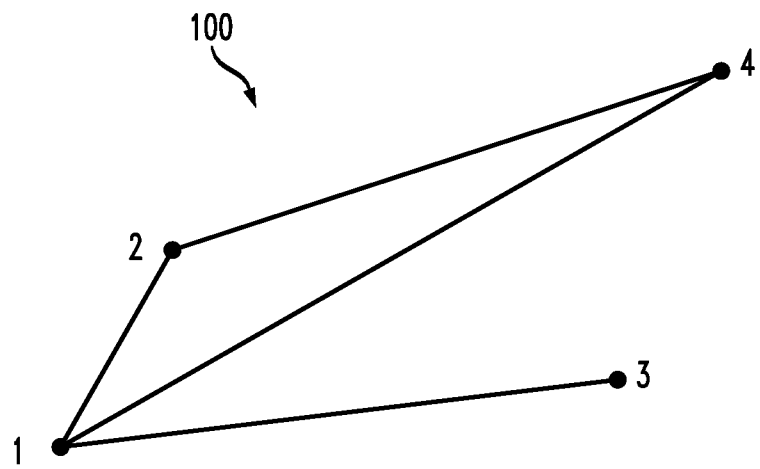
FIG. 1 depicts a simplified graph to which one or more inventive techniques may be applied.
FIG. 2 depicts a matrix according to an aspect of the invention.

With attention now to FIGS. 1 and 2, in one or more embodiments of the invention, a graph 100 can be modeled using the following steps. In the case of a directed graph, build a matrix, M, of the graph $G=(V, E)$, where a cell of the matrix $[i,j] \in E, i,j \in V$ is either zero if there is no edge between the node i and the node j; and equal to one otherwise. The matrix 200 for a directed graph 100 is shown in FIG. 2. In the case of an undirected graph, build only a triangular matrix as above, considereing only the case where i≦j. Graph 100 has four nodes, numbered 1 through 4. There are four edges, between nodes 1 and 2, 1 and 3, 1 and 4, and 2 and 4, respectively. The notation "i" refers to a row in matrix 200 while "j" refers to a column.

Figure 3:
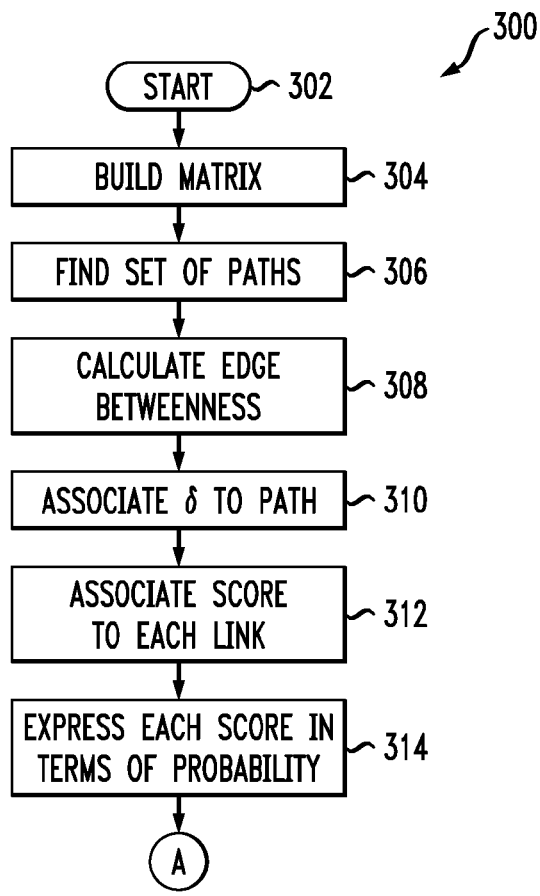
FIG. 3 is a flow chart showing exemplary modeling of a graph, and edge prediction using a single snapshot, according to an aspect of the invention.

With reference now also to flow chart 300 of FIG. 3, after starting at 302, build the matrix 200 as discussed above. As at 306, find the set $P_{i,j}$ of all the possible paths between the node i and j, i,j∈V. Note that $P_{i,j}=P_{j,i}$. For complexity reasons, as described in http://en.wikipedia.org/wiki/Six_degrees_of_seperation#_note_bara, in this particular example, limit the maximum length of a path to six. In the exemplary path search, consider only independent paths between two nodes as follows:

(i) describing a path from node i to node j as a sequence of edges, no node is repeated, or in other words, no path contains any cycles; and (ii) No two paths between node i and j exist such that one path is a subset of the other.

The skilled artisan is familiar, per se, with depth-based search. Given the teachings herein, the skilled artisan will be able to adapt depth-based search techniques to implementations of one or more embodiments of the invention, since at any instant, the maximum length of any path will not be greater than six. This method is believed advantageous in one or more embodiments, as it is also desirable to keep track of all paths between two nodes for the prediction method, as will be described hereinafter.

Now consider edge prediction using a single snapshot. As at block 308, for each edge, calculate the edge betweenness C or 'centrality' as described in equation (1):

$$C_{i,j} = \sum_{(i,j) \in E} \frac{\sigma_{u,v}(P_{i,j})}{\sigma_{u,v}} \quad (1)$$

where i,j,u,v∈V, $\sigma_{u,v}(P_{i,j})$ denotes the number of shortest paths from u to v that have an edge∈$P_{i,j}$ lying on them; $\sigma_{u,v}=\sigma_{v,u}$ as the edges are not directed. As at block 310, associate a single parameter value, denoted as δ, to each path, which could be, for example, either (i) the average of 'edge betweenness' of all the edges in the path (which is a measure of average strength of the path); or (ii) a minimum value of the 'edge betweenness' of all the edges in the path; which is a measure of strength of the path, as it targets the weakest link in the path. In this non-limiting exemplary implementation, preferably choose the average value, that is, option (i).

As shown in step 312, associated to each link is a final score S as defined in equation 2:

$$S(i,j) = \sum_{\forall P \in P_{i,j}} f(\|P\|) \times g(\delta) \quad (2)$$

where $\|P\|$ denotes the length of the path P; f( ) is non increasing function and g( ) is a non-decreasing function. In the exemplary implementation, use f as defined in equation 3:

$$f(x) \propto e^{-x^r} \text{ where } r \geq 0 \quad (3)$$

As shown at step 314, the final score S is expressed in terms of probability, as shown in equation (4):

$$p(i,j) = \frac{S(i,j)}{\sum_{k=1}^{v-1} f(k+1) \times P_{k-1}^{v-2}} \quad (4)$$

where $$P_m^n = \frac{n!}{(n-m)!}$$

is the probability of a path of length (n−1) between the nodes i and j. For example, using the topology of a complete graph, the denominator of equation (4) would reduce to S(i,j), and in this extreme case, g(δ) is equal to 1. It should be apparent a skilled artisan that any other score can also be used. Another non-limiting exemplary method is to map all the scores to a range between zero and one.

The final probability of an edge denotes a measure of the likelihood that a direct edge between (i,j) will appear in the future. The discussion with respect to FIG. 4 will enrich the prediction model by using a sequence of snapshots of a graph in order to predict the topology of the next instance of the graph.

Figure 4:
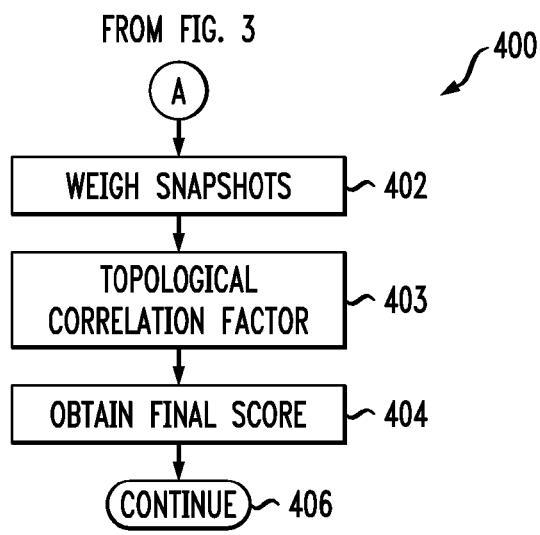
FIG. 4 is a flow chart showing topology prediction over a sequence of non-cumulative graphs, according to an aspect of the invention.

Attention should now be given to flow chart 400 of FIG. 4, pertaining to topology predition over a sequence of non-cumulative graphs. In particular, an exemplary embodiment is disclosed wherein a sequence of snapshots of G from time $t_1$ to $t_n$ is modeled to predict the topology of the graph G at time $t_{n+1}$. The encircled "A" indicates a logical continuation of the steps of FIG. 3. In block 402, a weight is assigned to each snaphot $G_i$ or $G_{t_i}$ of the graph G using equation (5):

$$W_i = H((n-i) \times C(X_i)) \text{ where } \sum_i^n W_i = 1 \quad (5)$$

where H is any non increasing function and C is a non decreasing function of the correlation factor $X_i$ defined in equation (6):

$$X_i = 0 \text{ if } i = 1 \quad (6)$$

$$X_i = \sum_{k=1}^{\|V\|} M_{i-1}(k) M_n$$

$X_i$ estimates the number of edges common in the previous snapshot versus the last snapshot. It is assumed that if $G_{i-1}$ is "similar" to $G_n$, then $G_{n+1}$ is most likely to be similar to $G_i$. Application of the (topological) correlation factor from Eq. 6 is depicted in step 403. Finally, as shown at 404, an estimate of the final score for each edge in $G_{n+1}$ is made as defined in equation (7):

$$S_{n+1}(i,j) = \sum_{k=1}^{n} S_k(i,j) \times W_k \quad (7)$$

It is noted that in the exemplary embodiment, the weight of each vertex and edge are considered to be equal. The formula given above in equation (7) can easily be extended by the skilled artisan, given the teachings herein, by adding a weight to each edge or vertex of the graph. Finally, the probabilities can be obtained by normalizing the weights between 0 and 1 (simply by dividing each weight by the sum of all weights). Processing continues at block 406.

Topological properties generally refer to the connectivity of the graph such as existence of cycle, clique, and so on, while topological similarities refer the existence of an edge between two given nodes or to how close the topology of a graph is to that of another graph. It is essentially a kind of measure that will indicate if the same edges appear or not. A network topology may have, for example, a ring, bus, star, mesh and/or cluster free topology. Each has a different set of properties. Topological properties, in general terms, include relationships in spatial terms between adjacent or connected objects.

In view of the foregoing discussion, it will be appreciated that one or more embodiments of the invention provide a method to predict edges of a graph based on a sequence of non-cumulative graphs. The prediction of the edges can be given, for example, in terms of probabilities. In some instances, the probabilities also indicate the importance of an edge to the integrity of the topology of the graph. Each edge of each graph can be weighted. The sequence of non-cumulative graphs can vary from one instance to a finite number.

One or more embodiments of the invention can be used in several scenarios. The following is a non-limiting list, for exemplary purposes:
- social network(s) in telecom-based application(s): being able to model the call usage (edges) of the different callers (nodes) is important data that different departments such as marketing or provisioning will look at to better understand the profile(s) of caller(s), provisioning of infrastructure (towers, links), marketing campaign(s), prevention of churn (customer(s) leaving the network), domino effect (one user is using a service; hence all the users connected to that user will use this service), and so on.
- social network web site: by predicting the usage and/or change of pattern(s) of usage of customer(s), the advertisements that can be offered will be impacted (and hence, the revenues for the site may be increased).
- being able to predict the network graph has a lot of implications, such as predicting the most important links (edges) to the structure of the network where the nodes are the hubs and switches of the network; predicting links that will disappear and appear are also equally important for capacity planning, as well as infrastructure planning.

One or more embodiments of the invention employ non-cumulative graphs (or temporal graphs), predict deletion as well as addition of edges and/or links, and use acyclic paths and more than one topological property. Further, one or more embodiments of the invention use a sequence of non-cumulative snapshots of a graph through time and use more than one property in input to a predictive function, to predict nodes. In at least some instances, the edge-betweenness property permits distinguishing between two new edges, which produce the same number of acyclic paths; and it is also possible to predict deletion and addition of edges and the structure of the graph. Yet further, with regard to the edge betweenness notion, in one or more embodiments, a different definition is used as a non-directed graph is considered; and hence, the end point of an edge is both a vertex of the edge. One or more embodiments of the invention provide a method to predict the whole structure of a temporal graph, not merely a partial structure.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
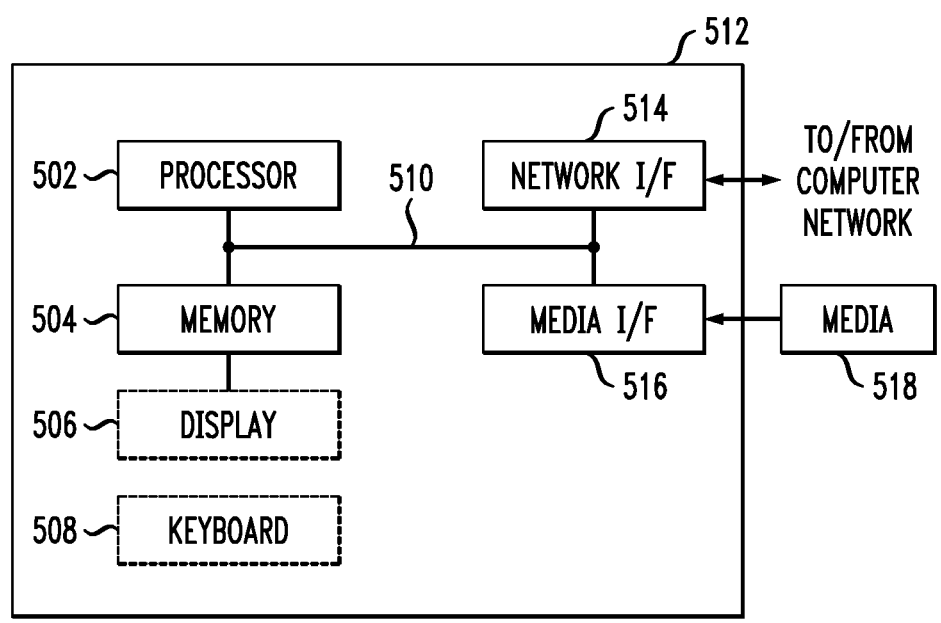
FIG. 5 depicts a computer system that may be useful in implementing one or more aspects and/or elements of the present invention.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 504), magnetic tape, a removable computer diskette (for example media 518), a random access memory (RAM), a read-only memory (ROM), a rigid magnetic disk and an optical disk. Current examples of optical disks include compact disk-read only memory (CD-ROM), compact disk-read/write (CD-R/W) and DVD.

A system, preferably a data processing system, suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer program product comprising a tangible computer useable storage medium including computer usable program code for predicting edges of a graph, based on a sequence of non-cumulative previous occurrences of said graph, said computer program product including:
   computer usable program code for obtaining said sequence of non-cumulative previous occurrences of said graph;
   computer usable program code for extracting topological properties of each of said previous occurrences of said graph;
   computer usable program code for computing topological similarities between each of said previous occurrences of said graph, based on said topological properties; and
   computer usable program code for predicting said edges of a future instance of said graph by computing a score for each possible edge of said graph, based upon said topological similarities, wherein the score comprises, for each edge, a probability of existing in the future instance and wherein each of said scores is weighted equally.

2. The computer program product of claim 1, wherein said probabilities for said possible edges indicate importance of a given one of said edges to integrity of topology of a given occurrence of said graph.

3. The computer program product of claim 2, wherein said given occurrence of said graph comprises one of said previous occurrences of said graph.

4. The computer program product of claim 2, wherein said given occurrence of said graph comprises a predicted occurrence of said graph based upon said predicted edges.

5. A system for predicting edges of a graph, based on a sequence of non-cumulative previous occurrences of said graph, said system comprising:
   a memory; and
   at least one processor, coupled to said memory, and operative to
      obtain said sequence of non-cumulative previous occurrences of said graph;
      extract topological properties of each of said previous occurrences of said graph;
      compute topological similarities between each of said previous occurrences of said graph, based on said topological properties; and
      predict said edges of a future instance of said graph by computing a score for each possible edge of said graph, based upon said topological similarities, wherein the score comprises, for each edge, a probability of existing in the future instance and wherein each of said scores is weighted equally.

6. The system of claim 5, wherein said probabilities for said possible edges indicate importance of a given one of said edges to integrity of topology of a given occurrence of said graph.

7. The system of claim 6, wherein said given occurrence of said graph comprises one of said previous occurrences of said graph.

8. The system of claim 6, wherein said given occurrence of said graph comprises a predicted occurrence of said graph based upon said predicted edges.

9. A system for predicting edges of a graph, based on a sequence of non-cumulative previous occurrences of said graph, said system comprising:
   means for obtaining said sequence of non-cumulative previous occurrences of said graph;
   means for extracting topological properties of each of said previous occurrences of said graph;
   means for computing topological similarities between each of said previous occurrences of said graph, based on said topological properties; and
   means for predicting said edges of a future instance of said graph by computing a score for each possible edge of said graph, based upon said topological similarities, wherein the score comprises, for each edge, a probability of existing in the future instance and wherein each of said scores is weighted equally.

10. The system of claim 9, wherein said probabilities for said possible edges indicate importance of a given one of said edges to integrity of topology of a given occurrence of said graph.

11. The system of claim 10, wherein said given occurrence of said graph comprises one of said previous occurrences of said graph.

12. The system of claim 10, wherein said given occurrence of said graph comprises a predicted occurrence of said graph based upon said predicted edges.

13. The system of claim 9, wherein said means for extracting topological properties of each of said previous occurrences of said graph comprises:
- means for building a matrix corresponding to each of said previous occurrences of said graph; and
- means for finding a set of paths, if any, between every node in each of said matrices corresponding to each of said previous occurrences of said graph.

\* \* \* \* \*